United States Patent
Barsali et al.

(10) Patent No.: US 10,940,956 B2
(45) Date of Patent: Mar. 9, 2021

(54) SUSPENSION SYSTEM FOR AN AIRCRAFT AUXILIARY POWER UNIT

(71) Applicant: AIRBUS OPERATIONS, S.L., Getafe (ES)

(72) Inventors: Guilherme Barsali, Getafe (ES); Víctor Barreiro Rodríguez, Getafe (ES)

(73) Assignee: Airbus Operations S.L., Madrid (ES)

( * ) Notice: Subject to any disclaimer, the term of this patent is extended or adjusted under 35 U.S.C. 154(b) by 448 days.

(21) Appl. No.: 15/379,879

(22) Filed: Dec. 15, 2016

(65) Prior Publication Data
US 2017/0166321 A1    Jun. 15, 2017

(30) Foreign Application Priority Data
Dec. 15, 2015  (EP) .................................. 15382627

(51) Int. Cl.
B64D 41/00    (2006.01)

(52) U.S. Cl.
CPC ........ B64D 41/00 (2013.01); *B64D 2041/002* (2013.01)

(58) Field of Classification Search
CPC .................. B64D 41/00–007; B64D 2041/002
USPC .......................................................... 244/54
See application file for complete search history.

(56) References Cited

U.S. PATENT DOCUMENTS

| | | | |
|---|---|---|---|
| 2,783,003 A | | 2/1957 | Ralston et al. |
| 4,037,809 A | * | 7/1977 | Legrand ................. B64D 27/18 244/54 |
| 4,412,774 A | * | 11/1983 | Legrand ................... B64F 5/50 180/298 |
| 5,170,968 A | * | 12/1992 | Helmner ................ B64D 9/003 244/137.1 |
| 5,190,246 A | * | 3/1993 | MacConochie .......... B64G 1/14 244/118.1 |
| 6,039,287 A | * | 3/2000 | Liston .................... B64D 29/00 244/120 |

(Continued)

FOREIGN PATENT DOCUMENTS

| | | |
|---|---|---|
| EP | 1 918 203 | 5/2008 |
| WO | 02/40347 | 5/2002 |

OTHER PUBLICATIONS

European Search Report cited in EP 15 38 2627, dated May 30, 2016, seven pages.

*Primary Examiner* — Marc Burgess
(74) *Attorney, Agent, or Firm* — Nixon & Vanderhye P.C.

(57) ABSTRACT

A suspension system for an aircraft auxiliary power unit (1) located in a fuselage structure (2) including: auxiliary power unit attachment brackets (3) arranged to be attached to the auxiliary power unit (1); fuselage attachment brackets (4) attached to the auxiliary power unit attachment brackets (3) and coupled to the fuselage structure (2); two longitudinal elements (5) arranged to be attached to the fuselage structure (2) in the longitudinal direction of the aircraft for supporting the auxiliary power unit (1), the two longitudinal elements (5) and the plurality of fuselage attachment brackets (4) being connected such that the two longitudinal elements (5) support the plurality of fuselage attachment brackets (4), being the fuselage attachment brackets (4) slidably movable along the longitudinal elements (5) for introducing or extracting the auxiliary power unit (1) into the fuselage structure (2).

23 Claims, 5 Drawing Sheets

(56) References Cited

U.S. PATENT DOCUMENTS

| | | | | |
|---|---|---|---|---|
| 6,581,874 | B2* | 6/2003 | Lemire | B64D 41/00 |
| | | | | 244/54 |
| 7,318,565 | B2* | 1/2008 | Page | B64C 39/024 |
| | | | | 244/54 |
| 8,657,233 | B2* | 2/2014 | Meseguer Mata | B64D 41/00 |
| | | | | 244/119 |
| 8,820,344 | B2* | 9/2014 | Vauchel | B64D 29/06 |
| | | | | 244/53 B |
| 2006/0032974 | A1 | 2/2006 | Williams | |
| 2006/0250055 | A1* | 11/2006 | Liu | E05B 65/462 |
| | | | | 312/218 |
| 2008/0099611 | A1* | 5/2008 | Martino Gonzalez | |
| | | | | B64D 29/08 |
| | | | | 244/119 |
| 2011/0062279 | A1* | 3/2011 | Welch | B21D 39/03 |
| | | | | 244/54 |

* cited by examiner

SUSPENSION SYSTEM FOR AN AIRCRAFT AUXILIARY POWER UNIT

RELATED APPLICATION

This application claims priority to European application no. 15382627.6 filed Dec. 15, 2015, and which is incorporated in its entirety.

FIELD OF THE INVENTION

The present invention refers to a suspension system for an aircraft Auxiliary Power Unit (APU), an engine or any heavy equipment significantly affecting the dynamic behavior of the surrounding structure of the aircraft.

BACKGROUND OF THE INVENTION

The Auxiliary Power Unit (APU) provides auxiliary power (pneumatic and electric) to the various systems in an aircraft and Main Engine Start. It is conventionally suspended by several rigid linkages that attach the APU to the fuselage generally in the tail cone structure.

The APU suspension system ensures that all the rigid body degrees of freedom (DOF) of the system are removed whilst allowing relative motion to absorb the thermal expansion of the APU and manufacturing and assembly tolerances. Additionally, it has the purpose of isolating the aircraft from the machine vibrations and vice-versa, for instance, isolating the APU from aerodynamic and inertia dynamic loads coming from the aircraft by creating a spring damper system that avoids dynamic coupling between the APU and the aircraft and minimizes load amplifications at critical frequencies.

Known suspension systems comprise struts or suspension rods for attaching the APU to the tail cone structure. They also comprise vibration isolators (VIs) attached to the end of the struts adjacent to the engine or auxiliary power unit for reducing the transmission of vibration and shocks from the APU to the aircraft structure and vice-versa. The vibration isolators comprise a housing in connection with the struts for enclosing an elastomeric element for absorbing said vibrations.

Furthermore, known suspension systems comprise APU attachment brackets for joining the Vibration Isolators (VIs) to the APU. The struts are joined to an extension of the housing. Each vibration isolator and its corresponding APU attachment bracket are called a mount.

Finally, a matching number of structure attachment brackets are located at the end of the struts adjacent to the fuselage tail cone structure for joining the struts to said fuselage structure.

The struts have, in some cases, double pin rod-ends allowing the transmission of moments into the struts. The disadvantage of such attachment configuration is not only that moments are carried by the struts but also that the dynamic behavior is predictability poor, leading to a high number of unexpected failures.

The entire suspension system is designed to withstand all vibration, shocks, inertia loads within the defined operational limits. Known suspension systems are designed for being fail-safe with regards to strut failures and hence with respect to the failure of any one of the suspension rods or their respective attachment brackets with the fuselage structure or with the vibration isolator housing and in case of failure of one strut, the rest of the struts, APU attachment brackets, vibration isolators and structure attachment brackets are designed to withstand limit loads.

In addition, each strut is also sized with safe-life criteria. That is to say, they are designed to withstand the whole life of the aircraft. The metallic components of the three APU mounts and the corresponding APU attachment bracket are also designed safe-life.

All other APU system interfaces are flexible to permit translational movement and rotational displacement of the APU in all directions.

In case of fire in the APU compartment, the design of the vibration isolator's core member and housing does not allow separation of these parts even if the elastomer component forming the vibration isolator is damaged or destroyed. Although the function of the vibrator isolators will then be lost, the APU will settle only slightly.

The three main limitations of this design approach are, on one hand, that in case any mount fails, the system as a whole fails, or in other words, the system is not fail-safe with respect to mount failures, potentially leading to an inadvertent APU detachment. On the other hand, the system also has poor reliability with lower than expected Mean Time Between Unscheduled Removals (MTBURs) owing to a high sensitivity to changes in the dynamic behavior, related to the coupling with the tail cone or local resonances, and internal loads distribution. Moreover, none of the mounts or vibration isolators has fail-safe devices such that they would accommodate a failure of any of their sub-components. Additionally, the complete assembly behaves as a bell-and-clapper with a coupling between them at certain vibration modes that amplify the dynamic input from flight (gusts, maneuver) or ground (landing, taxi) loads.

SUMMARY OF THE INVENTION

The suspension system has been invented that is intended for an aircraft auxiliary power unit located in a fuselage structure. The system, in one embodiment, comprises at least: a plurality of auxiliary power unit attachment brackets arranged to be connected to the auxiliary power unit, a plurality of fuselage attachment brackets being attached to the auxiliary power unit attachment brackets and arranged to be coupled to the fuselage structure.

The inventive suspension system further comprises two longitudinal elements arranged to be attached to the fuselage structure in the longitudinal direction of the aircraft for supporting the auxiliary power unit, the two longitudinal elements and the plurality of fuselage attachment brackets being connected such that the two longitudinal elements support the plurality of fuselage attachment brackets, being the vibration isolators slidably movable along the longitudinal elements for introducing or extracting the auxiliary power unit into the fuselage structure.

Therefore, the invention creates synergy between the fuselage structure and the suspension system by merging the suspension system and some of the main load-carrying items in the fuselage giving rise to multi-function members such as to reduce the combined weight.

Accordingly, the two longitudinal elements act as a rail to support the APU mounting points. Such rails also work as longerons on the fuselage tail cone structure, giving it additional strength and stiffness to the fuselage structure.

Furthermore, it also allows to forego the APU access doors together with their underlying mechanisms and structure reinforcements, contributing thus to a weight improvement. Therefore, it is a further object of the invention a tail cone of an aircraft comprising a first part that is attached to the suspension system and enclosing the auxiliary power unit, and a second part which is located adjacent to the first part in a longitudinal axis and comprising the rear part of the aircraft, i.e., located towards the rear part. Said second part is movable with respect to the first part between a closed position and an open position that leaves the cross section of the first part adjacent to the second part accessible from the exterior of the aircraft, that leading to the possibility of introducing or extracting the auxiliary power unit through this cross section instead that through an access door. Afterwards the APU is moved to its final position thanks to the combination of the sliding movement of the fuselage attachment brackets with respect to the longitudinal elements that act as a rail. Accordingly, one of the advantages of said configuration is that the APU can be installed from the rear side of the aircraft.

Another of the advantages of the invention is to improve the dynamic behavior of the system by reducing coupling between APU and tail cone. This is reflected in the reduction of the APU Dynamic Amplification Factors (DAFs).

Moreover, common load-carrying elements for the APU and tail cone result in potentially substantial weight savings because the skin panels are uniformly loaded, leading to a weight reduction, having a better distribution of the internal loads and contributing to rigidize and reinforce the tail cone.

Additionally, the claimed invention minimizes the uncertainties, making the internal loads prediction easier and more precise. The better prediction has a long lasting effect on the product in-service behavior as the system is less prone and less sensitive to degradation.

Moreover, this invention reduces the time needed for APU installation thanks to quick release devices.

The invention possesses a potential for redundancy either intrinsically at each mount or of the system as a whole, where an additional mount "fills-in" and restrain the APU rigid body degrees of freedom. Hence, the system can be easily rendered fully fail-safe.

The absence of struts makes its dynamic behavior easier to predict and less prone to changes in the dynamic behavior, be it due to changes in local mass distributions, geometry, wear or fitting parameters.

Finally, the invention creates synergy between the APU and the fuselage structure, not only reducing the dynamic amplification (bell-and-clapper effect), but also reinforcing and stiffening the Equipped Tail cone assembly (Tail cone+ APU) due to the internal load path thus created, i.e. the system-structure interaction not only is not prone to coupling, but also inherently reinforce each other.

For this application, the coordinate system is based on an XYZ system. The X-axis of this system is positive pointing aft. The Z-axis is positive pointing upward. To complete a right-handed coordinate system, the Y-axis is positive pointing along the plane's right wing.

DESCRIPTION OF THE FIGURES

To complete the description and in order to provide for a better understanding of the invention, a set of drawings is provided. Said drawings form an integral part of the description and illustrate preferred embodiments of the invention. The drawings comprise the following figures.

DETAILED DESCRIPTION OF THE INVENTION

Figure 1:
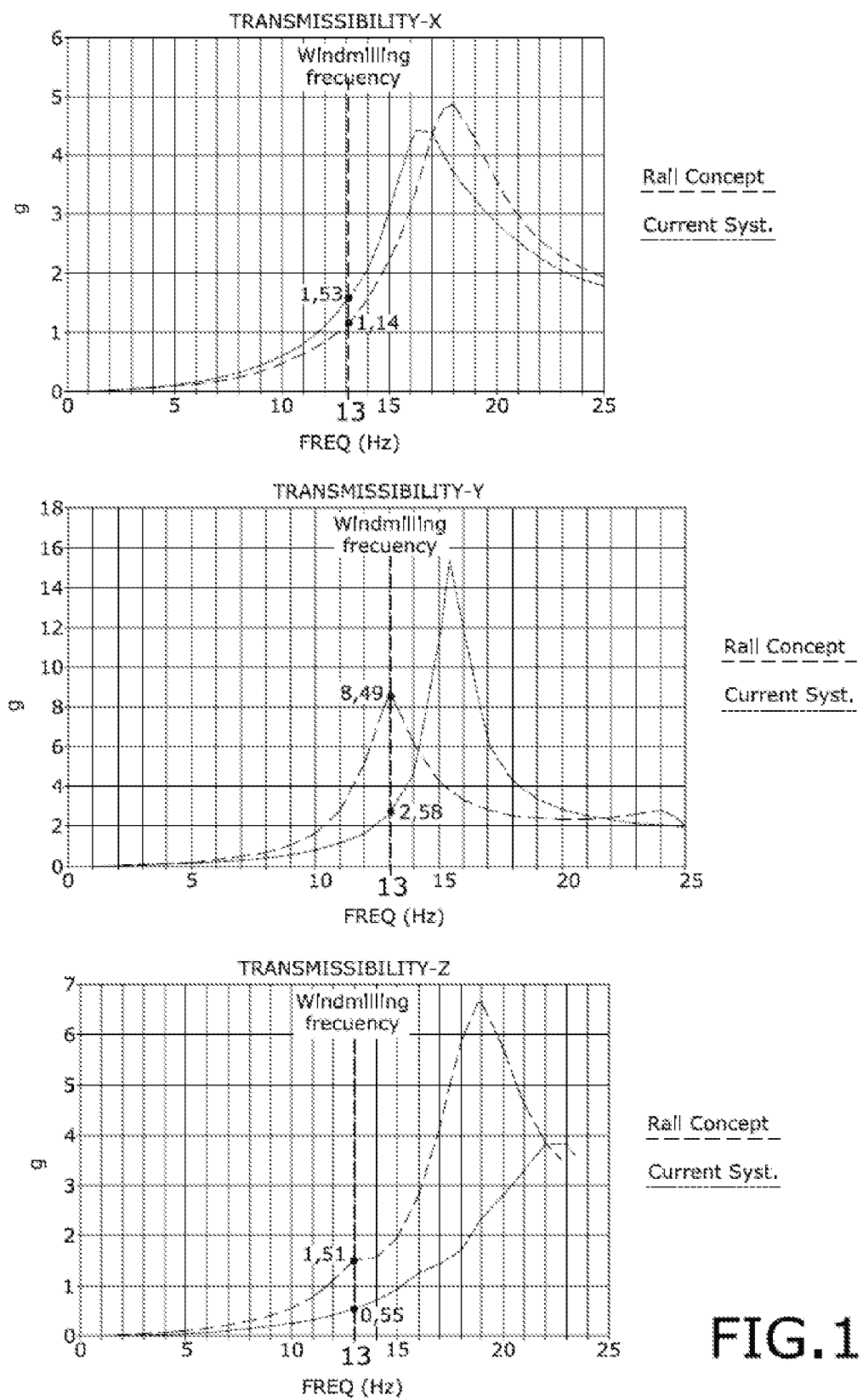
FIG. 1 shows tables disclosing the comparison in terms of dynamic amplification of known systems and the suspension system object of the invention.

The tables included in FIG. 1 show that there are lower sizing loads, showing that the dynamic amplification factors are reduced in flight loads (up to 10 Hz) and SEI wind milling (up to 13 Hz) ranges. This translates into resulting static loads at the APU center of gravity and benefits the rest of the fuselage, as the tail cone loads are carried forward along the aircraft load path.

A suspension system for an aircraft auxiliary power unit (1) located in a fuselage structure (2) including: auxiliary power unit attachment brackets (3) arranged to be attached to the auxiliary power unit (1); fuselage attachment brackets (4) attached via a rigid beam (12) to the auxiliary power unit attachment brackets (3) and coupled to the fuselage structure (2); two longitudinal elements (5) arranged to be attached to the fuselage structure (2) in the longitudinal direction of the aircraft for supporting the auxiliary power unit (1), the two longitudinal elements (5) and the plurality of fuselage attachment brackets (4) being connected such that the two longitudinal elements (5) support the plurality of fuselage attachment brackets (4), being the fuselage attachment brackets (4) slidably movable along the longitudinal elements (5) for introducing or extracting the auxiliary power unit (1) into the fuselage structure (2).

In the disclosed embodiments, the fuselage attachment brackets (4) comprise a vibration isolator comprising an elastomeric element for damping vibrations. The vibration isolators are optionally embedded into a metallic structure. Another possibility would be to have a hard sliding element.

Figure 3:
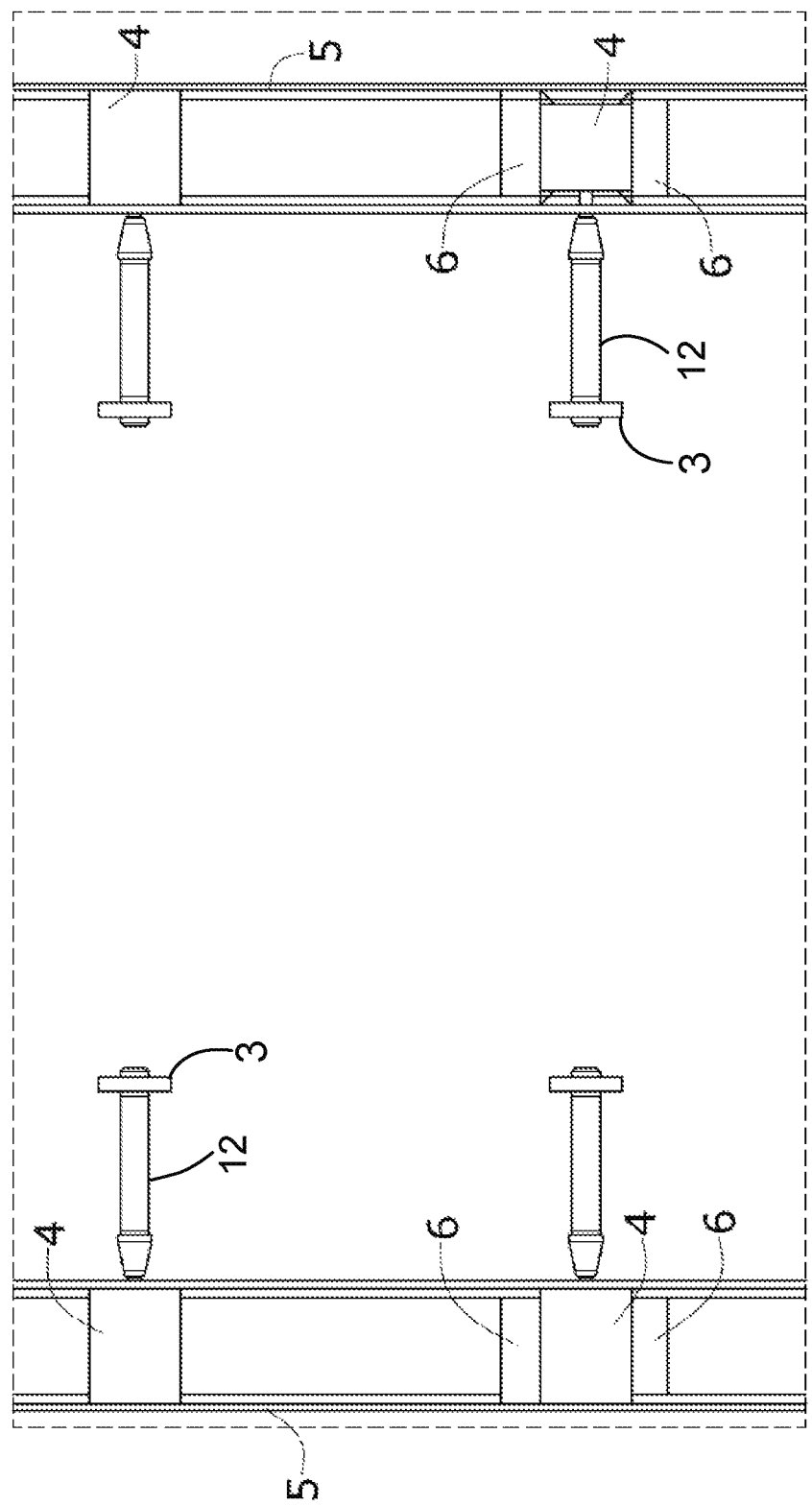
FIG. 3 shows a plan schematic view of an embodiment of a pair of longitudinal elements and four fuselage attachment brackets.
Figure 4:
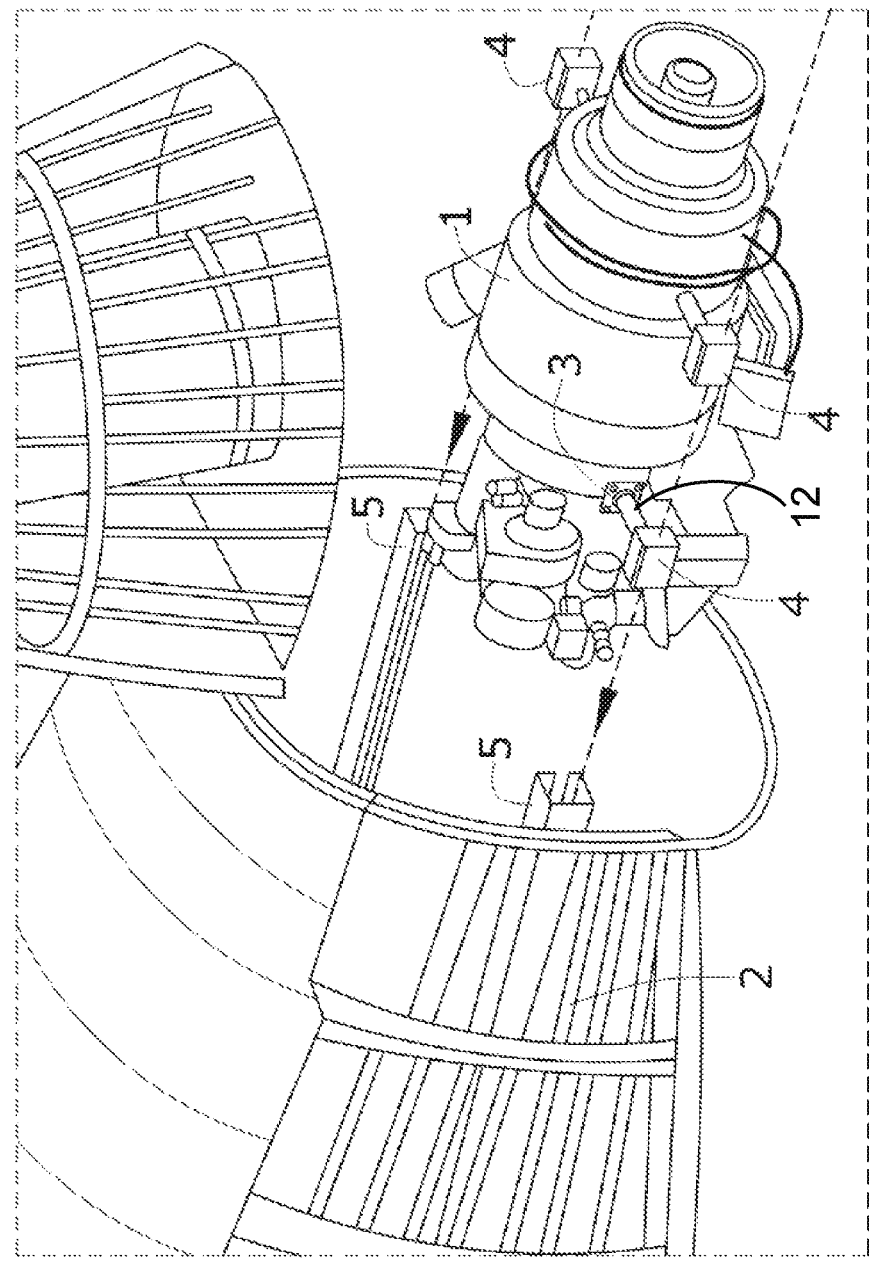
FIG. 4 shows a perspective view of an embodiment of the suspension system of the invention.

FIGS. 3 and 4 disclose an embodiment in which the fuselage attachment brackets (4), more specifically vibration isolators, are arranged to slide inside the longitudinal elements (5), said longitudinal elements (5) particularly comprising a closed tube having a C-shaped cross-section. Said cross-section prevents the fuselage attachment brackets (4) from movement in the Z and Y directions.

More specifically, FIG. 3 shows an example of an embodiment showing the two parallel longitudinal elements (5) and four fuselage attachment brackets (4). Once in operation, one of the fuselage attachment brackets (4) is fixed in X, Y, Z by interposing a stopper (6) into the longitudinal element (5) at both sides of the fuselage attachment brackets (4) which additionally avoids the movement in X direction.

Two of the fuselage attachment brackets (4) are fixed in Z and Y a fourth one (4) is fixed in Z, X allowing an slight movement in Y as the longitudinal element (5) would have enough space in the fuselage attachment bracket (4) position to absorb the displacements coming from thermal expansion and tolerances.

Although four attachment brackets (4) are disclosed, three attachment brackets (4) would be enough.

Figure 5:
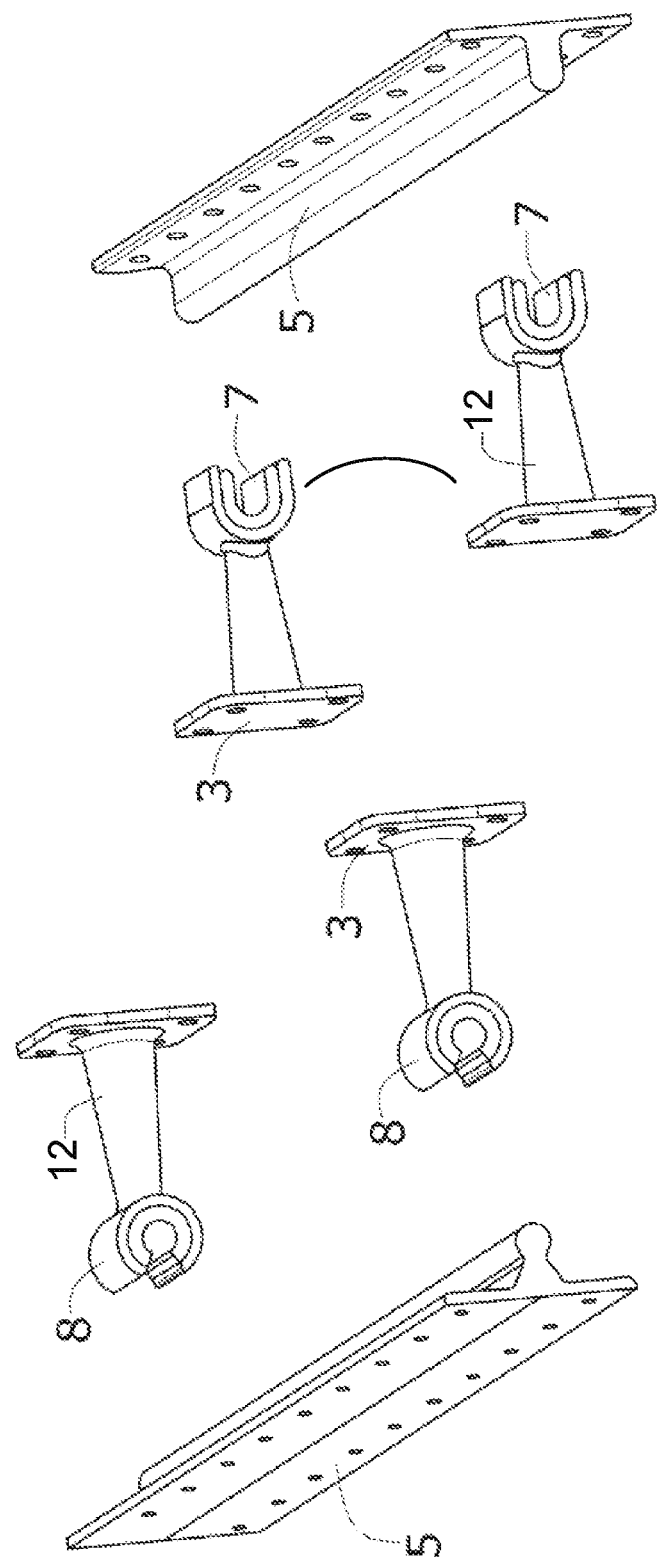
FIG. 5 shows a perspective schematic view of another embodiment of the suspension system of the invention.

A different embodiment is disclosed in FIG. 5 in which the fuselage attachment brackets (4) are arranged to slide outside the longitudinal elements (5) as the longitudinal elements (5) comprise a closed section while the fuselage attachment brackets (4) enclose said closed section. In this embodiment, the fuselage attachment brackets (4) comprise an U shape (7) if movement into the Z direction is not allowed and it comprises a C shape (8) if movement into the Z and Y directions is not allowed.

Figure 2:
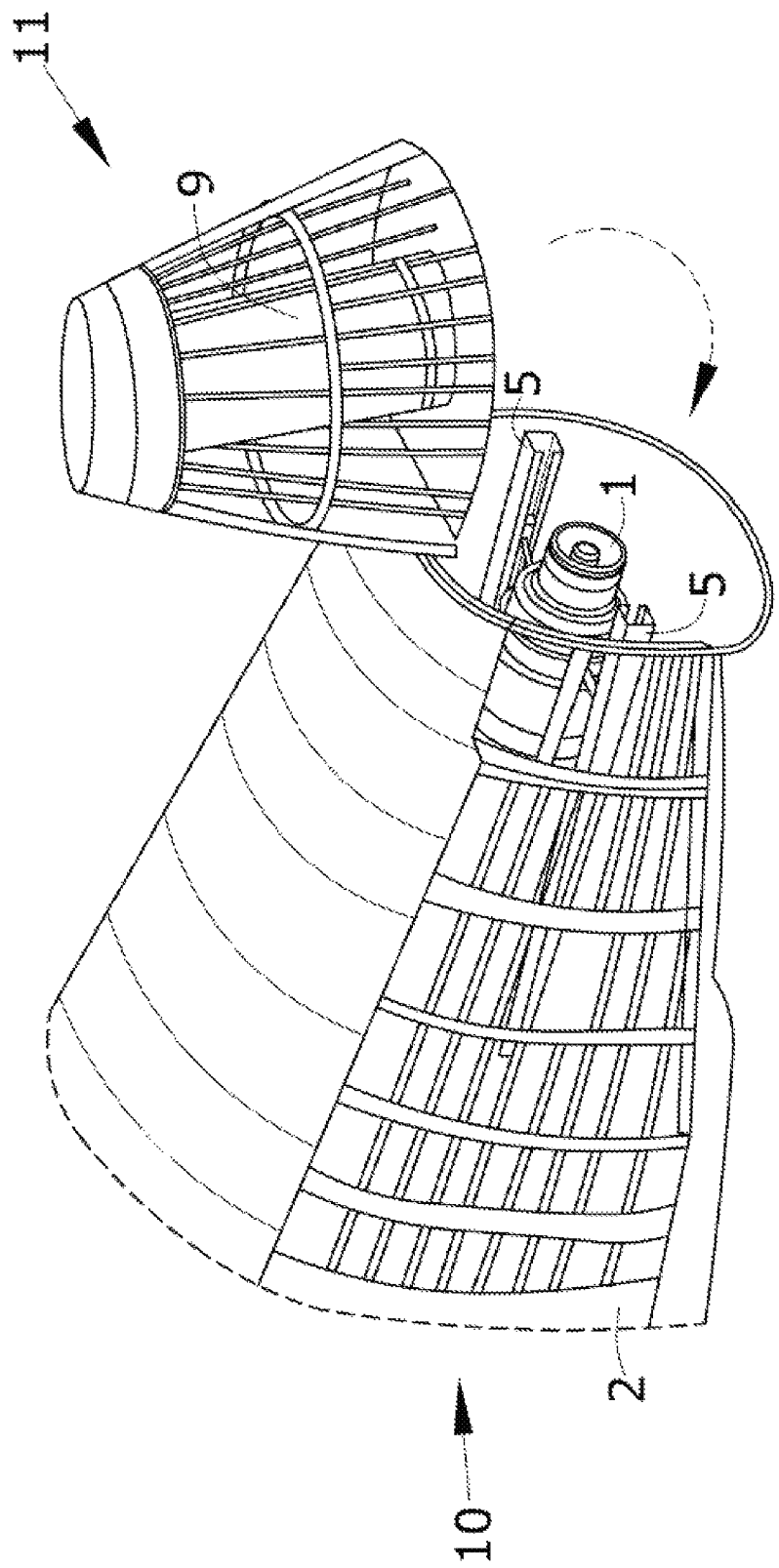
FIG. 2 shows a perspective view of an embodiment of the tail cone of a fuselage.

FIG. 2 and FIG. 4 disclose an embodiment in which the two longitudinal elements (5) are arranged to be located diametrically opposed in the fuselage structure (2).

FIG. 2 discloses a tail cone in which the fuselage structure (2) comprises: a first part (10) that is attached to the suspension system and that encloses the auxiliary power unit (1), and a second part (11) located adjacent to the first part (10) in a longitudinal axis forward the rear part of the aircraft and that therefore comprises said rear part of the aircraft. An exhaust tube (9) or muffler may be integrated into this second part (11) or be a separated piece of equipment installed therein.

The second part (11) is movable with respect to the first part (10) between a closed position and an open position. The open position leaves the cross section of the first part (10) adjacent to the second part (11) accessible from the exterior of the aircraft for the access to the interior of the first part (10) to introduce or extract the auxiliary power unit (1) through this cross section. More specifically, the second part (11) is hinged to the first part (10).

Additionally, as previously stated, the second part (11) comprises an exhaust tube (9) of the auxiliary power unit (1) that is part of the rear end. Said exhaust tube (9) is therefore integrated into the structure of the tail cone that creates an additional synergy.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A suspension system for an aircraft auxiliary power unit located in a fuselage structure of an aircraft, the system comprising:
   a plurality of auxiliary power unit attachment brackets arranged to be attached to the auxiliary power unit,
   a plurality of fuselage attachment brackets attached to the auxiliary power unit attachment brackets and arranged to be coupled to the fuselage structure,
   a plurality of rigid beams, wherein each of the fuselage attachment brackets is at one end of a respective one of the rigid beams and an opposite end of the respective one of the rigid beams is connected to one of the auxiliary power unit attachment brackets and each of the rigid beams has an axis which extends through the fuselage attachment bracket and the auxiliary power attachment bracket;
   two longitudinal elements arranged to be attached to the fuselage structure in the longitudinal direction of the aircraft configured to support the auxiliary power unit during flight of the aircraft, the two longitudinal elements and the plurality of fuselage attachment brackets are connected such that the two longitudinal elements support the plurality of fuselage attachment brackets, and
   a pair of stopper blocks interposed in one of the two longitudinal elements such that each of the stopper blocks is adjacent and abuts one of the fuselage attachment brackets, and the stopper blocks are positioned on opposite sides of the one of the fuselage attachment brackets;
   wherein, while the stopper blocks are not interposed in the two longitudinal elements, the fuselage attachment brackets are slidably movable along the longitudinal elements for introducing or extracting the auxiliary power unit into the fuselage structure.

2. The suspension system, according to claim 1, wherein the fuselage attachment brackets are arranged to slide inside the longitudinal elements.

3. The suspension system, according to claim 2, wherein the longitudinal elements comprise a C-shaped cross-section.

4. The suspension system, according to claim 1, wherein the fuselage attachment brackets are arranged to slide outside the longitudinal elements.

5. The suspension system, according to claim 1, wherein one of the fuselage attachment brackets of the plurality of fuselage attachment brackets is arranged to be fixed with respect to the longitudinal element in X, Y and Z directions of the aircraft.

6. The suspension system, according to claim 1, wherein one of the fuselage attachment brackets of the plurality of fuselage attachment brackets is arranged to be fixed with respect to the longitudinal element in Y and Z directions of the aircraft.

7. The suspension system, according to claim 1, wherein one of the fuselage attachment brackets of the plurality of fuselage attachment brackets is arranged to be fixed with respect to the longitudinal element in X and Z directions of the aircraft.

8. The suspension system, according to claim 1, wherein the fuselage attachment brackets comprises a vibration isolator comprising an elastomeric element for damping vibrations.

9. A tail cone of an aircraft comprising a fuselage structure and an auxiliary power unit located inside said fuselage structure wherein it further comprises a suspension system according to claim 1.

10. The tail cone, according to claim 9, wherein the two longitudinal elements are arranged to be located diametrically opposed in the fuselage structure.

11. The tail cone of an aircraft, according to claim 9, wherein the fuselage structure comprises:
   a first part that is attached to the suspension system and enclosing the auxiliary power unit, and
   a second part located adjacent to the first part towards the rear part of the aircraft in a longitudinal axis, said second part being movable with respect to the first part between a closed position and an open position that leaves the cross section of the first part adjacent to the second section accessible from the exterior of the aircraft for the access to the interior of the first part to introduce or extract the auxiliary power unit through this cross section.

12. The tail cone of an aircraft, according to claim 11, wherein the second part comprises an exhaust tube of the auxiliary power unit.

13. The suspension system of claim 1 wherein each of the rigid beams has a length along the axis of the rigid beam and between the fuselage attachment bracket and the auxiliary power attachment bracket greater than a maximum dimension along the axis of the fuselage attachment bracket.

14. A suspension system for an aircraft auxiliary power unit located in a fuselage of an aircraft, the suspension system comprising:
auxiliary power unit attachment brackets configured to attach to the auxiliary power unit;
fuselage attachment brackets configured to attach to the auxiliary power unit attachment brackets and configured to connected to the fuselage structure;
a plurality of rigid beams, wherein each of the fuselage attachment brackets is at one end of a respective one of the rigid beams and an opposite end of the one of the rigid beams is connected to one of the auxiliary power unit attachment brackets and each of the rigid beams has an axis which extends through the fuselage attachment bracket and the auxiliary power attachment bracket attached to the rigid beam;
longitudinal elements configured to attach to the fuselage in a longitudinal direction of the aircraft, wherein the longitudinal elements support the auxiliary power unit during flight of the aircraft, and the longitudinal elements and the fuselage attachment brackets are connected such that the longitudinal elements support the fuselage attachment brackets, and
a pair of stopper blocks interposed in one of the two longitudinal elements such that each of the stopper blocks is adjacent and abuts one of the fuselage attachment brackets, and a pair of the stopper blocks are positioned on opposite sides of the one of the fuselage attachment brackets,
wherein, while the stopper blocks are not interposed in the longitudinal element, the fuselage attachment brackets are slidably movable along the longitudinal elements to introduce or extract the auxiliary power unit into the fuselage structure.

15. The suspension system of claim 14 wherein the longitudinal elements are rails, and each of the fuselage attachment brackets have a first end configured to be fixedly attached to the auxiliary power unit and a second end configured to slidably engage one of the rails.

16. The suspension system of claim 15 wherein the rails are on opposite sides of the fuselage structure and are aligned in a horizontal plane of the aircraft fuselage.

17. The suspension system of claim 15 wherein the attachment brackets include a first pair of the attachment brackets which are on a first side of the auxiliary power unit and aligned along a longitudinal axis of the fuselage structure, and a second pair of the attachment brackets which are on a second side, opposite to the first side, of the auxiliary power unit and aligned along the longitudinal axis, wherein the first pair of the attachment brackets engage a first one of the rails and the second pair of the attachment brackets engage a second one of the rails.

18. An aircraft auxiliary power unit and suspension assembly comprising:
an auxiliary power unit;
rails attached to an inner surface of a rear portion of an aircraft fuselage, wherein the rails are aligned parallel to a longitudinal axis of the aircraft fuselage;
fuselage attachment brackets fixed to the auxiliary power unit, wherein the fuselage attachment brackets extend outwardly from the auxiliary power unit and each slidably engage one of the rails,
auxiliary power unit attachment brackets attached to the auxiliary power unit;
rigid beams, wherein each of the fuselage attachment brackets is at one end of a respective one of the rigid beams and an opposite end of the one of the respective one of the rigid beams is connected to one of the auxiliary power unit attachment brackets, and each of the rigid beams has an axis which extends through the fuselage attachment bracket and the auxiliary power attachment bracket attached to the rigid beam; and
a pair of stopper blocks interposed in each of the rails such that each of the stopper blocks is adjacent and abuts one of the fuselage attachment brackets, and the stopper blocks are on opposite sides of the one of the fuselage attachment brackets,
wherein the auxiliary power unit is supported in the aircraft by the attachment brackets engaging the rails and while the aircraft is in flight wherein, while the stopper blocks are not interposed in the two rails, the fuselage attachment brackets are slidably movable along the rails for introducing or extracting the auxiliary power unit into the fuselage.

19. The aircraft auxiliary power unit suspension assembly of claim 18 wherein the rails are on opposite sides of the aircraft fuselage and are aligned in a horizontal plane of the aircraft fuselage, and
wherein each of the attachment brackets has an end which engages one of the rails, and the end includes an elastomeric vibration isolator.

20. The aircraft auxiliary power unit suspension assembly of claim 18 wherein the attachment brackets include a first pair of the attachment brackets which are on a first side of the auxiliary power unit and aligned along the longitudinal axis, and a second pair of the attachment brackets which are on a second side, opposite to the first side, of the auxiliary power unit and aligned along the longitudinal axis, wherein the first pair of the attachment brackets engage a first one of the rails and the second pair of the attachment brackets engage a second one of the rails.

21. The aircraft auxiliary power unit suspension assembly of claim 18 wherein each of the rails have a cross section which is a C-shape or an I-shape.

22. The suspension system of claim 18, wherein each of the rigid beams has a length along the axis of the rigid beam and between the fuselage attachment bracket and the auxiliary power attachment bracket greater than a maximum dimension along the axis of the fuselage attachment bracket.

23. The aircraft auxiliary power unit and suspension assembly of claim 18, wherein each of the rigid beams has a length along the axis of the rigid beam and between the fuselage attachment bracket and the auxiliary power attachment bracket greater than a maximum dimension along the axis of the fuselage attachment bracket.

* * * * *